United States Patent
Xie et al.

[11] Patent Number: 5,289,481
[45] Date of Patent: Feb. 22, 1994

[54] FOUR-FOLD AND HIGHER ORDER CONTINUOUS-WAVE UPCONVERSION LASERS

[75] Inventors: Ping Xie; Stephen Rand, both of Ann Arbor, Mich.

[73] Assignee: Unversity of Michigan, Ann Arbor, Mich.

[21] Appl. No.: 947,111

[22] Filed: Sep. 18, 1992

Related U.S. Application Data

[63] Continuation-in-part of Ser. No. 926,058, Aug. 5, 1992.

[51] Int. Cl.$^5$ .................................................. H01S 3/14
[52] U.S. Cl. ......................................... 372/39; 372/18;
                                                  372/92; 372/69
[58] Field of Search ..................... 372/18, 92, 69, 39,
                                                  372/41

[56]        References Cited
         U.S. PATENT DOCUMENTS

| | | | |
|---|---|---|---|
| 5,038,358 | 8/1991 | Rand | 372/41 |
| 5,086,432 | 2/1992 | Estrowitz et al. | 372/41 |
| 5,200,966 | 4/1993 | Estrowitz | 372/41 |

*Primary Examiner*—Leon Scott, Jr.
*Attorney, Agent, or Firm*—Rohm & Monsanto

[57] ABSTRACT

Four-fold and higher order lasers pumped by multiphoton absorption, avalanche mechanisms, or other means of internal upconversion for continuous-wave and continuous-wave mode-locked lasers. A solid-state laser system is contained within an astigmatically compensated cavity containing first and second mirrors. The gain medium is formed of a crystal of lithium yttrium fluoride heavily doped (5%) with trivalent erbium, or another form of crystal, such as $CaF_2$ where the dopant atoms are clustered in quartets. The crystal, in a lithium yttrium fluoride embodiment, is approximately 3 mm thick with both sides thereof being polished flat to a laser grade finish. A pumping source supplies a pumping energy having a wavelength of 1.5 $\mu$m to the gain medium, which wavelength is considerable longer than the output wavelength (701.5 nm) of the laser system. The gain medium may additionally be an alkali vapor formed of Cesium or Rubidium.

23 Claims, 3 Drawing Sheets

FOUR-FOLD AND HIGHER ORDER CONTINUOUS-WAVE UPCONVERSION LASERS

GOVERNMENT RIGHTS

This invention was made under contract awarded by the Air Force Office of Scientific Research, Contract Number AFOSR-91-0369, and is a continuation of work performed under Contract Number F49620-88-C-0079, also awarded by the Air Force Office of Scientific Research. The government has certain rights in the invention.

RELATIONSHIP TO OTHER APPLICATION

This is a continuation-in-part of copending U.S. patent application Ser. No. 07/926,058 which was filed on Aug. 5, 1992 in the name of one of the inventors herein and assigned to the same assignee as herein. The entirety of the disclosure in that copending patent application is incorporated herein by reference.

RELATIONSHIP TO PATENT

The subject matter of this application of United States Letters Patent is related to that of U.S. Pat. No. 5,038,358, which issued on Aug. 6, 1991 to one of the inventors herein, and is assigned to the same assignee as herein. The entirety of the disclosure in that patent is incorporated herein by reference.

BACKGROUND OF THE INVENTION

1. Field of the Invention

This invention relates generally to laser systems, and more particularly, to a laser device which relies upon energy-sharing interactions between atomic quartets, whereby four-fold continuous-wave laser action is produced.

2. Description of the Prior Art

There is a need for short-wavelength operation of optically-excited, solid state and other lasers. Short wavelength lasers, particularly solid state lasers which are compact and efficient, have considerable promise for applications to high density optical disk storage as well as various display and communications markets. Although some forms of earlier upconversion lasers address the need in the art, to an extent, these known arrangements fall short of ideal performance, as there is a need for a laser system which achieves much high upconversion factors. It is believed that a significant improvement over preexisting upconversion laser systems would require a new, and consequently important, mechanism for achieving very short wavelength solid state laser sources.

Current compact disks use infrared diode lasers for reading and writing information on storage media. Much shorter wavelengths can be produced using upconversion processes which are the basis of the current invention. Previous upconversion lasers and patents on the topic refer only to pair or trio processes for the achievement of the population inversion which is essential to obtain laser action. Prior publications exist regarding the achievement of laser action based on multiphoton absorption, avalanche pumping and cooperation upconversion. However, no previous upconversion laser of any description has achieved continuous-wave laser action from states lying about the ground state by more than three times the incident photon energy.

There is, therefore, a need for a continuous-wave laser system wherein laser action is achieved from energy states lying at least four times the incident energy per photon above the ground state. A laser system which would achieve this result is expected to make practical a variety of new, short wavelength solid state lasers (ultraviolet wavelengths) which have previously not operated at all or have not operated efficiently because of the conventional need for pump sources with more energy per photon than the emitting state of the laser transition. Pair-pumped solid state lasers can operate at wavelengths as short as one half that of the pump light.

As previously noted, short wavelength solid state lasers, if sufficiently efficient, should be important for improved compact disk storage technology. This is because shorter wavelengths make smaller focal spot sizes possible. Hence, increased storage density becomes possible on a disk of given area. (Of the various categories of convention lasers which exist, solid state lasers lend themselves best to miniaturization and low total power consumption. these factors are additional, key aspects of their significance for commercialization.)

Existing compact disk technology relies on GaAs-GaAlAs diode lasers operating at a wavelength of 800 nm in the near infrared region. A pair laser pumped by light of this wavelength could operate at wavelengths as short as 400 nm, resulting in an improvement in storage capacity of a factor of four. This nonlinear increase in storage capacity result from the fact that spot radius is proportional to wavelength but storage density depends on the spot area, proportional to the square of the radius. Hence, significant improvements in storage can result from small decreases in operating wavelength.

There are currently no blue or ultraviolet solid state lasers which operate continuously and have been developed commercially for compact disk applications or other technologies, such as space communications. The present invention will provide to the art a new mode of laser excitation that will permit the development of new short wavelength solid state lasers for which there has previously been no suitable excitation mechanism. For emission wavelengths short enough to approach the fundamental absorption edge of solids, it is not possible to deliver conventional excitation at still shorter wavelengths without severe heating and damage of the solid, and very low efficiencies. Pump light cannot even penetrate to the interior of the lasing medium. By contrast, upconversion-pumping permits excitation at longer wavelengths than either the emission wavelength of the energy of the emitting state with respect to the ground state. Hence, penetration of the pump light is not a problem, and deleterious color center formation can be avoided.

There is no prior art known to Applicants describing continuous-wave solid state lasers in which pumping is provided by four-fold or higher upconversion. Prior art does exist for two-fold and three-fold upconversion lasers in several Er-doped crystals. However, there is no suggestion in the known art that inversion can be sustained continuously by such unlikely processes as those requiring the absorption of four or more photons, or the energy-pooling of four or more initially excited ions, or some combination of these mechanisms.

It is, therefore, an object of this invention to provide a laser system wherein short-wavelength emission is achieved in response to longer-wavelength optical excitation of solid state laser media.

It is another object of this invention to provide a short-wavelength laser system which does not require pump sources with more energy per photon than the emitting state of the laser transition.

It is also an object of this invention to provide a laser arrangement which achieves a significantly reduced focal spot size.

It is a further object of this invention to provide a laser arrangement which improves the storage density of a compact disk by a factor of four.

It is additionally an object of this invention to provide a laser system which can operate at wavelengths on the order of 700 nm.

It is yet a further object of this invention to provide a laser arrangement which is adaptable for miniaturization, and which is efficient in its energy utilization.

It is also another object of this invention to provide a short-wavelength solid state laser which can readily be miniaturized.

It is yet an additional object of this invention to provide a blue or ultraviolet continuous-wave solid state laser.

SUMMARY OF THE INVENTION

The foregoing and other objects are achieved by this invention which provides four-fold and higher order lasers pumped by multiphoton absorption, avalanche mechanisms, or other means of internal upconversion for continuous-wave and continuous-wave mode-locked lasers.

In accordance with a first aspect of the invention, a solid-state laser system having an astigmatically compensated cavity containing first and second mirrors. A gain medium formed of a crystal of lithium yttrium fluoride heavily doped with trivalent erbium is arranged within the astigmatically compensated cavity. Additionally, a pumping source supplies a pumping energy to the gain medium.

In one embodiment of the invention, the doping of the gain medium with trivalent Erbium is on the order of 5%. In an advantageous, specific embodiment of the invention, the crystal is approximately 3 mm thick with both sides thereof being polished flat to a laser grade finish.

With respect to optical pumping, the pumping means is a continuous-wave NaCl color center which is focused into the gain medium and operated at approximately 1.5 microns at about 200 mW. The gain medium is maintained at a temperature of approximately 10° K. and operated at approximately 200 mW.

In a further embodiment of the invention, the astigmatically compensated cavity is a folded cavity, and the gain medium is Brewster-oriented therein. Preferably, the angle between the two arms of the folded cavity in the specific illustrative embodiment is selected to compensate for astigmatism at the Brewster-oriented gain medium. The first and second mirrors in the cavity are highly reflective in the high energy states which are reached by the upconversion process. The first and second mirrors transmit approximately 80% of incident pump light at 1.5 μm and are essentially totally reflective at an output laser wavelength of 701.5 nm. Each mirror, in the illustrative embodiment has a curvature of approximately 5 cm, and there is further provided a pump focusing lens. In a specific, illustrative embodiment of the invention, the lens has a focal length of 5 cm.

In accordance with a further aspect of the invention, a solid-state laser system is provided with an astigmatically compensated cavity containing first and second mirrors, a gain medium formed of a crystal having therein dopant ions clustered as quartets, the gain medium being arranged within the astigmatically compensated cavity, and a pumping source for supplying a pumping energy to the gain medium.

In accordance with a specific illustrative embodiment of this second aspect of the invention, the solid state laser system is provided with a crystal as the gain medium formed of $CaF_2$. In this embodiment, charge compensation mandates clustering of isomorphic dopant ions which incorporate trivalent rare earth ions predominantly as neighbor pairs. The $CaF_2$ crystal is isomorphic with $CsNiCl_3$. In a further embodiment, the crystal of the gain medium is formed of a glass having a low dominant phonon frequency.

In a still further embodiment of the invention, a laser system is provided with an astigmatically compensated cavity containing first and second mirrors, a gain medium formed of a vapor wherein collisions between excited atoms cause transient coupling; and a pumping source for supplying a pumping energy to the gain medium.

In one embodiment, the vapor is an alkali vapor which may be formed of Cesium. In another embodiment, the alkali vapor is Rubidium.

In accordance with a still further aspect of the invention, a laser system for producing continuously a laser energy from an energy state which lies higher than an incident photon energy, is provided with a gain medium formed of a 5% $Er:LiYF_4$ for producing laser action, the gain medium being contained within a laser cavity having first and second mirrors. There is further provided a pumping source for supplying a pumping energy having a wavelength of 1.5 μm to the gain medium, the laser action in the gain medium occurring at a wavelength of 701.5 nm, corresponding to four-fold energy increase over the wavelength of the pumping energy.

In one embodiment of this further aspect, the pumping energy produces in the gain medium a multiphoton absorption phenomenon. In another embodiment, the pumping energy produces in the gain medium an avalanche phenomenon. Preferably, of course, the pumping energy produces in the gain medium an internal upconversion phenomenon. The solid state laser system may be a continuous-wave mode-locked laser.

BRIEF DESCRIPTION OF THE DRAWING

Comprehension of the invention is facilitated by reading the following detailed description, in conjunction with the annexed drawing, in which.

DETAILED DESCRIPTION

Figure 1:
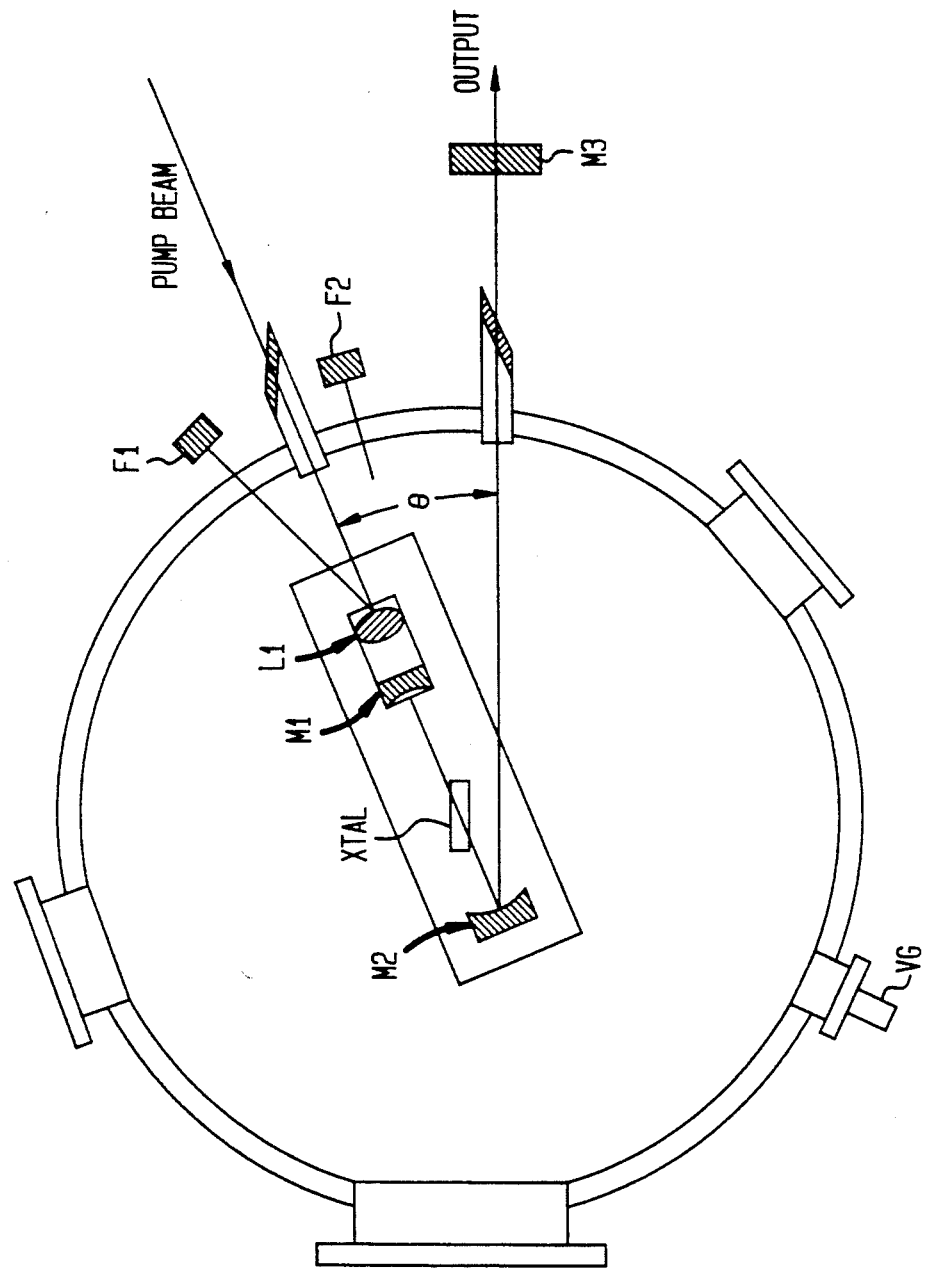
FIG. 1 is a simplified schematic representation of an experimental laser cavity vacuum chamber which functions in accordance with the principles of the invention.

FIG. 1 is an experimental apparatus which functions as an astigmatically-corrected, 3-mirror upconversion laser cavity. The Brewster-oriented ($\theta_B = 55.6°$) gain medium in the present experiment consisted of a 3 mm thick crystal of 5% Er:LiYF$_4$ with its optic axis parallel to the crystal surface, in the plane of incidence of the horizontally polarized pump field. This orientation permits gain extraction on both $\pi$ and $\sigma$ polarized transitions. In this embodiment, the Er:LiYF$_4$ crystal was suspended on a cold finger (not shown) at the center of the cavity of a vacuum chamber. A tunable, continuous-wave NaCl color center laser provided resonant excitation of individual $^4I_{13/2}$ Stark levels of Er$^{3+}$ near 1.5 $\mu$m, and an inter-arm angle of $\theta = 26.2°$ compensated for astigmatism introduced by the two 5 cm radius curved mirrors at the output wavelength of 701.5 nm.

Implementation of the invention is relatively simple and consists of placing a single crystal (Xtal) of Lithium Yttrium Fluoride heavily doped with trivalent Erbium (5%) into a folded upconversion laser cavity, as shown in FIG. 1. The crystal was cut to a thickness of 3 millimeters and both faces were polished flat to a laser grade finish.

Laser emission was achieved using mirrors (M1 and M2) of high reflectivity on a transition involving only those ions in the high energy states reached by the upconversion process. The high reflector transmitted over 80% of incident pump light at 1.5 $\mu$m, had a curvature of 5 cm and was totally reflective at 701.5 nm. The folding mirror was identical. The output coupler (M3) had a reflectivity of approximately 96.5% at the output laser wavelength. The angle ($\theta$) between the two arms of the folded cavity was chosen to compensate astigmatism at the Brewster-oriented laser crystal. Two hundred milliwatts from a continuous-wave NaCl color center (not specifically shown) operating at 1.5 $\mu$m was propagated along the axis marked "pump beam" and focused into the crystal (Xtal) at a temperature of 10° K. with a single lens (L1) having a focal length 5 cm. This was sufficient to reach laser threshold at an output wavelength of 701.5 nm. The vacuum level within the laser cavity is monitored via a conventional vacuum gauge (VG), shown in FIG. 1.

Figure 2:
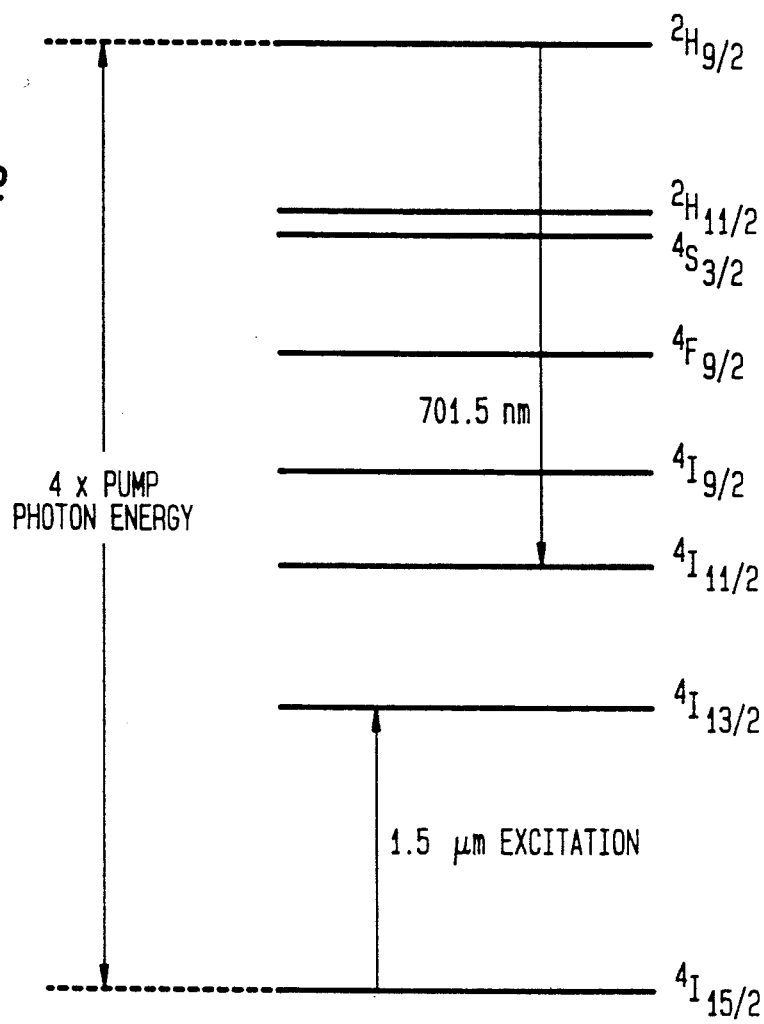
FIG. 2 is a diagram illustrating the initial and final states of the continuous-wave upconversion laser of the present invention operating at 701.5 nm.
Figure 3:
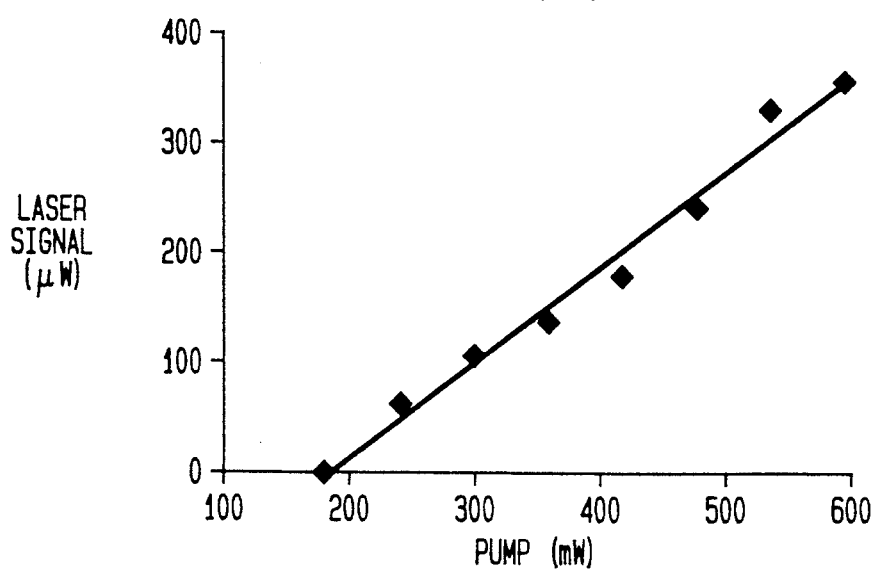
FIG. 3 is a graphical representation of the output power of the continuous-wave upconversion laser of the present invention operating at 701.5 nm as a function of pump power at $\lambda_{ex}=1.5$ μm in $Er:LiYF_4$ at 10° K.

The scheme of the laser and its performance are indicated in FIGS. 2 and 3, respectively. FIG. 2 is a diagram illustrating the initial and final states of the continuous-wave upconversion laser of the present invention operating at 701.5 nm. As shown in this figure, the 1.5 $\mu$m excitation raises the energy of an electron from the $^4I_{15/2}$ level to the $^4I_{13/2}$ level. The output energy of 701.5 nm results from a transition between the $^2H_{9/2}$ and the $^4I_{11/2}$ level.

FIG. 3 is a graphical representation of the output power of the continuous-wave upconversion laser of the present invention operating at 701.5 nm as a function of pump power at $\lambda_{ex} = 1.5$ $\mu$m in Er:LiYF$_4$ at 10° K. As shown, the relationship is substantially linear.

Figures 4, 5:
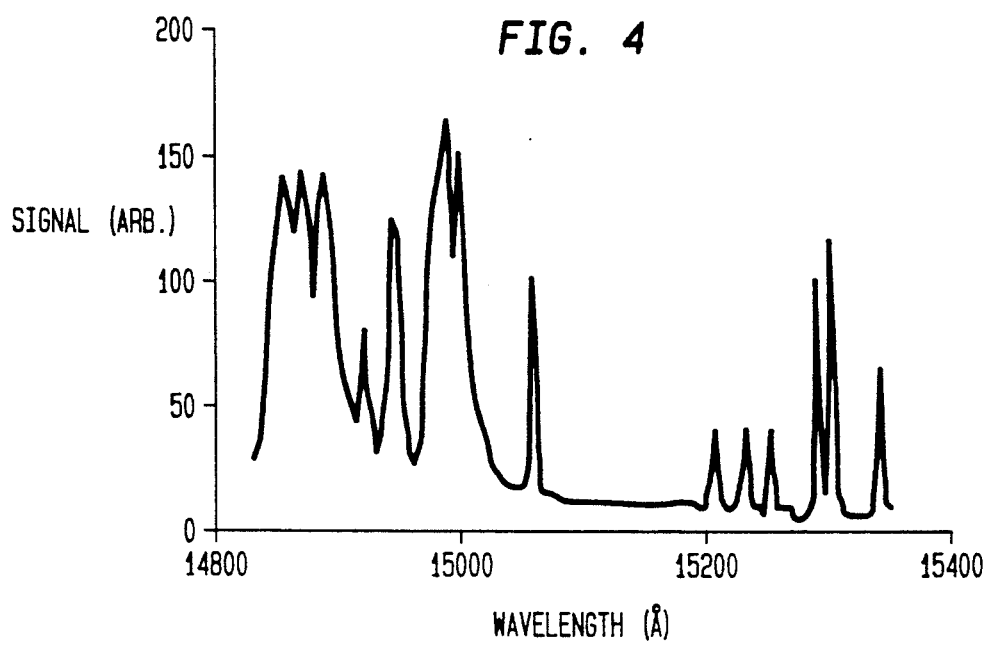
FIG. 4 is a graphical representation of the excitation spectrum of the continuouswave upconversion laser of the present invention operating at 701.5 nm in Er:-LiYF$_4$ at 10° K.
FIG. 5 is a graphical representation of the four-fold upconversion laser emission spectrum.

FIG. 4 is a graphical representation of the excitation spectrum of the continuous-wave upconversion laser of the present invention operating at 701.5 nm in Er:-LiYF$_4$ at 10° K. The tallest peak in the spectrum is shown to occur at a wavelength of approximately 15000 Å.

FIG. 5 is a graphical representation of the four-fold upconversion laser emission spectrum. As shown, normalized signal amplitude is plotted against lambda.

True continuous-wave operation of the new laser disclosed herein was verified experimentally by monitoring the narrow beam emission using a fast photodiode (bandwidth ~ 100 MHz). With active cooling of the crystal, stable operation was observed for many hours.

The laser disclosed herein is also pumped in a manner and with a degree of upconversion which is quite distinct from capabilities of avalanche or cross-relaxation-pumped devices. Cross-relaxation pumping of lasers exploits a spontaneous pair process, but one which populates only states with energies lower than the initial excited state of either coupled atom. The pumping scheme relies on conventional pumping of one atom in a coupled pair, followed by down-conversion which yields two atoms in much lower energy states. Spontaneous upconversion plays no role, as it does in the present device.

Specific features of the invention include long wavelength pumping at 1.5 $\mu$m of a crystal doped with an unusually high concentration of rare earth ions (5% trivalent Erbium in Lithium Yttrium Fluoride). Laser action was obtained at 701.5 nm at liquid helium temperature on the $^2H_{9/2} - ^4I_{11/2}$ transition of Er$^{+3}$. Due to the high dopant concentration and the nature of the crystal host used, aggregates of rare earth ions exist within the solid. These aggregates consist of dopant ions in clusters. Electromagnetic coupling between dopant neighbors in pair clusters permits ions which individually reach an excited state by absorbing single photons from the incident light to "pool" or combine their energy, through what is known as a cooperative transition. One ion may become "doubly" or "triply" excited while the other becomes de-excited. In the present invention, a fourth order process of this type appears to contribute to the generation of highly excited atoms. However, absorption of additional pump photons may also contribute to the upconversion process.

Additional methods of implementation involve four possible changes:

(i) Changes of crystal host to alter the proportion of dopant ions which cluster as quartets. For example, CaF$_2$ crystals in which charge compensation mandates clustering of dopant ions or crystals isomorphic with CsNiCl$_3$, like CsCdBr$_3$, are known to incorporate trivalent rare earth ions predominantly as near neighbor pairs, all oriented identically along the optic axis. This kind of crystal incorporates dopant ions far more efficiently as pairs than ordinary crystals, and would furnish unusually high concentrations of quartets at high doping. Such a host would therefore be expected to enhance the contribution to upconversion in the material due to cooperative quartet processes.

(ii) Changes in the dopant to other rare earth ions or to transition metal ions.

(iii) Changes in the cavity configuration in ways well known to persons of ordinary skill in the art of laser construction. Such variations would be within the scope of the present invention. For example, mirrors of different radii of curvature and dielectric coatings would be useful in optimizing gain extraction from the laser crystal.

(iv) Substitution of appropriate vapors or gas mixtures for the solid upconversion-pumped laser medium. Collisions between excited atoms in gases will cause transient coupling equivalent to the coupling between dopants in solids. Collision-induced transitions can result in a variety of normally forbidden processes, including spontaneous, cooperative upconversion processes, and pair-pumped laser action, as would occur in condensed media. In particular, alkali vapors like Cesium and Rubidium will undergo upconversion processes during resonant collisions and excited state inversion would then be possible by new upconversion processes which have not been previously observed, such as higher order cooperative upconversion or avalanche processes.

(v) alternation of the host medium to a glass, particularly a glass with low dominant phonon frequency. Upconversion processes are enhanced in glasses with low frequency phonons because non-radiative decay rates of rare earth ions decrease in such media. Such a modification would have the effect of enhancing the upconversion processes themselves as well as increasing the radiative efficiency of highly excited ions.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A solid-state laser system for producing an output laser energy at a first predetermined wavelength, the solid-state laser system comprising:
   an astigmatically compensated cavity containing first and second mirrors;
   a gain medium formed of a crystal of lithium yttrium fluoride heavily doped with trivalent erbium arranged within said astigmatically compensated cavity; and
   pumping means for supplying a pumping energy of a second predetermined wavelength to said gain medium, said second predetermined wavelength being longer than said first predetermined wavelength, whereby four-fold laser action is achieved.

2. The solid state laser system of claim 1 wherein said doping of said gain medium with trivalent Erbium is on the order of 5%.

3. The solid state laser system of claim 1 wherein said pumping means comprises a continuous-wave NaCl color center focused into said gain medium.

4. The solid state laser system of claim 3 wherein said continuous-wave NaCl color center is operated at approximately 1.5 $\mu$m.

5. The solid state laser system of claim 4 wherein said gain medium is maintained at a temperature of approximately 10° K. has it is pumped by said pumping means, said continuous-wave NaCl color center being operated at approximately 200 mW.

6. The solid state laser system of claim 1 wherein said astigmatically compensated cavity is a folded cavity, and said gain medium is Brewster-oriented therein.

7. The solid state laser system of claim 6 wherein an angle between two arms of said folded cavity is selected to compensate for astigmatism at said Brewster-oriented gain medium.

8. The solid state laser system of claim 1 wherein said first and second mirrors are of high reflectivity in the high energy states which are reached by an upconversion process.

9. The solid state laser system of claim 8 wherein said first and second mirrors transmit approximately 80% of incident pump light at 1.5 $\mu$m and are essentially totally reflective at an output laser wavelength of 701.5 nm.

10. The solid state laser system of claim 8 wherein said first and second mirrors have a curvature of approximately 5 cm, and there is further provided a pump focusing lens.

11. The solid state laser system of claim 1 wherein said crystal of said gain medium has a thickness of approximately 3 mm and both faces thereof polished flat to a laser grade finish.

12. A solid-state laser system for producing an output laser energy at a first predetermined wavelength, the solid-state laser system comprising:
   an astigmatically compensated cavity containing first and second mirrors;
   a gain medium formed of a crystal having therein dopant ions clustered as quartets, said gain medium being arranged within said astigmatically compensated cavity; and
   pumping means for supplying a pumping energy of a second predetermined wavelength to said gain medium, said second predetermined wavelength being longer than said first predetermined wavelength, whereby four-fold laser action is achieved.

13. The solid state laser system of claim 12 wherein said crystal of said gain medium is formed of $CaF_2$, wherein charge compensation mandates clustering of isomorphic dopant ions which incorporate trivalent rare earth ions predominantly as neighbor pairs.

14. The solid state laser system of claim 13 wherein said $CaF_2$ crystal is isomorphic with $CsNiCl_3$.

15. The solid state laser system of claim 12 wherein said crystal of said gain medium is formed of a glass having a low dominant phonon frequency.

16. A solid-state laser system for producing an output laser energy at a first predetermined wavelength, the solid-state laser system comprising:
   an astigmatically compensated cavity containing first and second mirrors;
   a gain medium formed of a vapor wherein collisions between excited atoms cause transient coupling; and
   pumping means for supplying a pumping energy of a second predetermined wavelength to said gain medium, said second predetermined wavelength being longer than said first predetermined wavelength, whereby four-fold laser action is achieved.

17. The solid state laser system of claim 16 wherein said vapor is an alkali vapor.

18. The solid state laser system of claim 17 wherein said alkali vapor is formed of Cesium.

19. The solid state laser system of claim 17 wherein said alkali vapor is formed of Rubidium.

20. A laser system for producing continuously a laser energy from an energy state which lies higher than an incident photon energy, the laser source comprising:
   cavity means containing first and second mirrors;
   a gain medium formed of a 5% $Er:LiYF_4$ for producing laser action, said gain medium being contained within said cavity means; and
   pumping means for supplying a pumping energy having a wavelength of 1.5 $\mu$m to said gain medium, said laser action in said gain medium occurring at a wavelength of 701.5 nm, corresponding to fourfold energy increase over said wavelength of said pumping energy.

21. The solid state laser system of claim 20 wherein said pumping energy produces in said gain medium a multiphoton absorption phenomenon.

22. The solid state laser system of claim 20 wherein said pumping energy produces in said gain medium an avalanche phenomenon.

23. The solid state laser system of claim 20 wherein said pumping energy produces in said gain medium an internal upconversion phenomenon, said solid state laser system being a continuous-wave mode-locked laser.

* * * * *